United States Patent
Peden

(10) Patent No.: US 9,743,654 B2
(45) Date of Patent: Aug. 29, 2017

(54) INSECT TRAP

(71) Applicant: Les Peden, Oklahoma City, OK (US)

(72) Inventor: Les Peden, Oklahoma City, OK (US)

( * ) Notice: Subject to any disclaimer, the term of this patent is extended or adjusted under 35 U.S.C. 154(b) by 0 days.

(21) Appl. No.: 14/183,774

(22) Filed: Feb. 19, 2014

(65) Prior Publication Data

US 2014/0237892 A1 Aug. 28, 2014

Related U.S. Application Data

(60) Provisional application No. 61/769,419, filed on Feb. 26, 2013, provisional application No. 61/858,908, filed on Jul. 26, 2013.

(51) Int. Cl.
*A01M 1/02* (2006.01)
*A01M 1/20* (2006.01)
*A01M 1/10* (2006.01)

(52) U.S. Cl.
CPC ............... *A01M 1/10* (2013.01); *A01M 1/02* (2013.01); *A01M 1/103* (2013.01); *A01M 1/20* (2013.01)

(58) Field of Classification Search
CPC .... A01M 1/00; A01M 1/02; A01M 1/10; A01M 1/103; A01M 1/20
USPC ............... 43/107, 109, 121, 124, 131, 132.1
See application file for complete search history.

(56) References Cited

U.S. PATENT DOCUMENTS

| | | | | |
|---|---|---|---|---|
| 57,036 | A * | 8/1866 | Beach | 43/109 |
| 223,321 | A * | 1/1880 | Denton | 43/109 |
| 759,030 | A * | 5/1904 | Sheaffer | 43/131 |
| 1,248,283 | A * | 11/1917 | Derck et al. | A01M 29/34 |
| | | | | 119/61.53 |
| 1,402,998 | A * | 1/1922 | Anderson | 248/188.2 |
| 3,704,539 | A * | 12/1972 | Alvarez | A01M 1/2011 |
| | | | | 43/131 |
| 4,953,506 | A * | 9/1990 | Sanders | 119/61.53 |
| 5,042,192 | A * | 8/1991 | Osteen | 43/109 |
| 5,090,153 | A | 2/1992 | Mullen et al. | |
| 5,148,626 | A * | 9/1992 | Haake, Sr. | 43/121 |
| 5,253,609 | A * | 10/1993 | Partelow | A01K 5/0142 |
| | | | | 119/61.53 |
| 5,381,557 | A | 1/1995 | Luria et al. | |
| 5,467,738 | A * | 11/1995 | Cass | A01K 5/0142 |
| | | | | 119/51.12 |
| 5,619,952 | A * | 4/1997 | Walker | 119/61.53 |
| 5,943,816 | A * | 8/1999 | Hyatt et al. | 43/131 |
| 5,996,531 | A * | 12/1999 | Anderson | 119/61.53 |
| 6,378,242 | B1 * | 4/2002 | Roberts | 43/109 |
| 2009/0282728 | A1 | 11/2009 | McKnight et al. | |
| 2011/0088310 | A1 | 4/2011 | Parker et al. | |

(Continued)

OTHER PUBLICATIONS

"Climbup Insect Interceptor Bed Bug Monitor and Trap (Large)"; printed Feb. 6, 2013; pp. 1-6; www.bedbugsupply.com/climbup-insect-interceptor-bed-bug-monitor.html.

*Primary Examiner* — David Parsley

(74) *Attorney, Agent, or Firm* — King & Schickli, PLLC

(57) ABSTRACT

An insect trap positioned directly under a furniture leg or post during use. The insect trap has a bottom portion with a groove positioned between an outer edge of the bottom portion and an inner element extending from the center of the bottom portion. The trap also has a distinct top portion having an opening extending through the entirety of the top portion. The top and bottom portion are removably attached to one another.

8 Claims, 9 Drawing Sheets

(56) References Cited

U.S. PATENT DOCUMENTS

2011/0107654 A1 5/2011 Wieler
2012/0210628 A1 8/2012 Park et al.

* cited by examiner

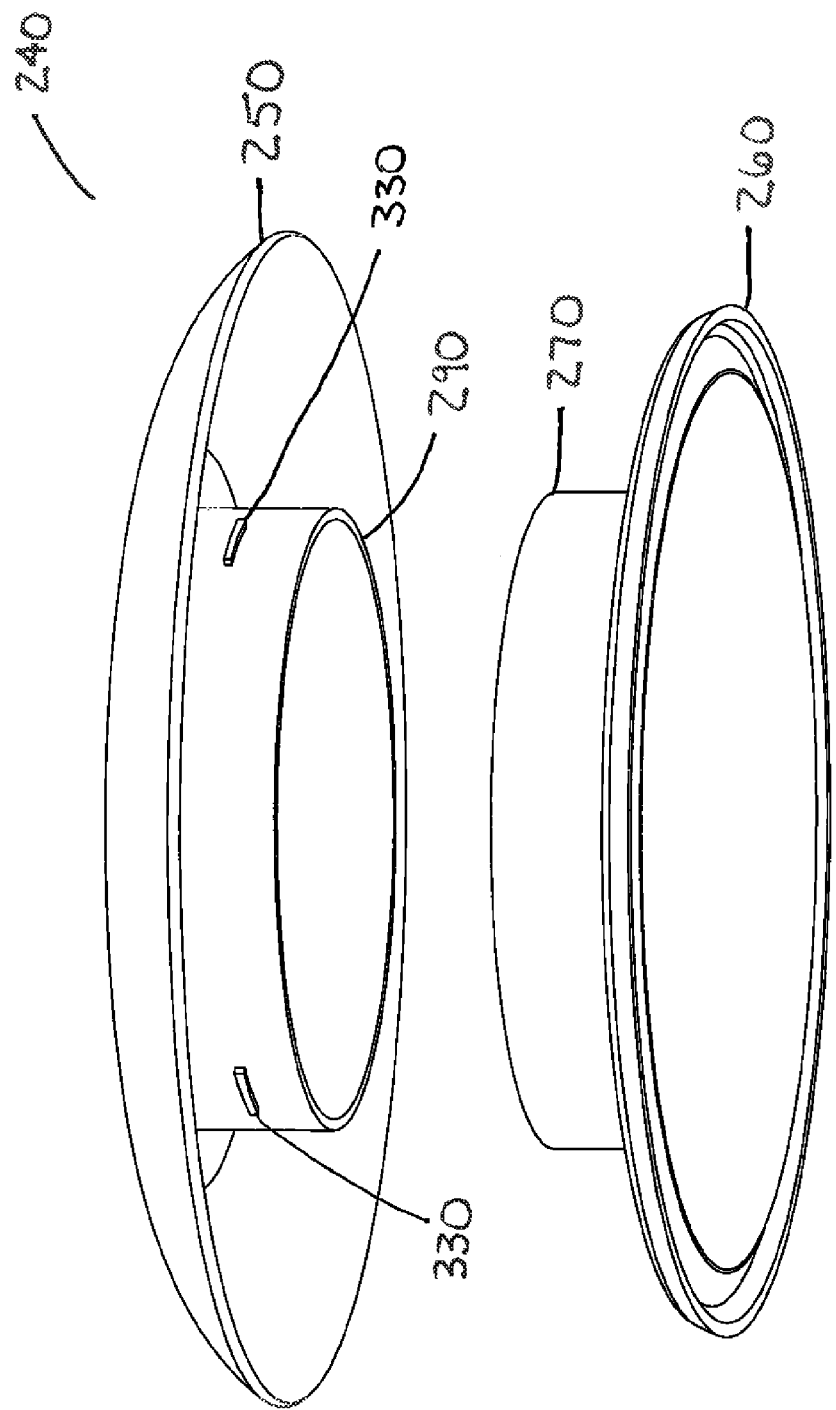

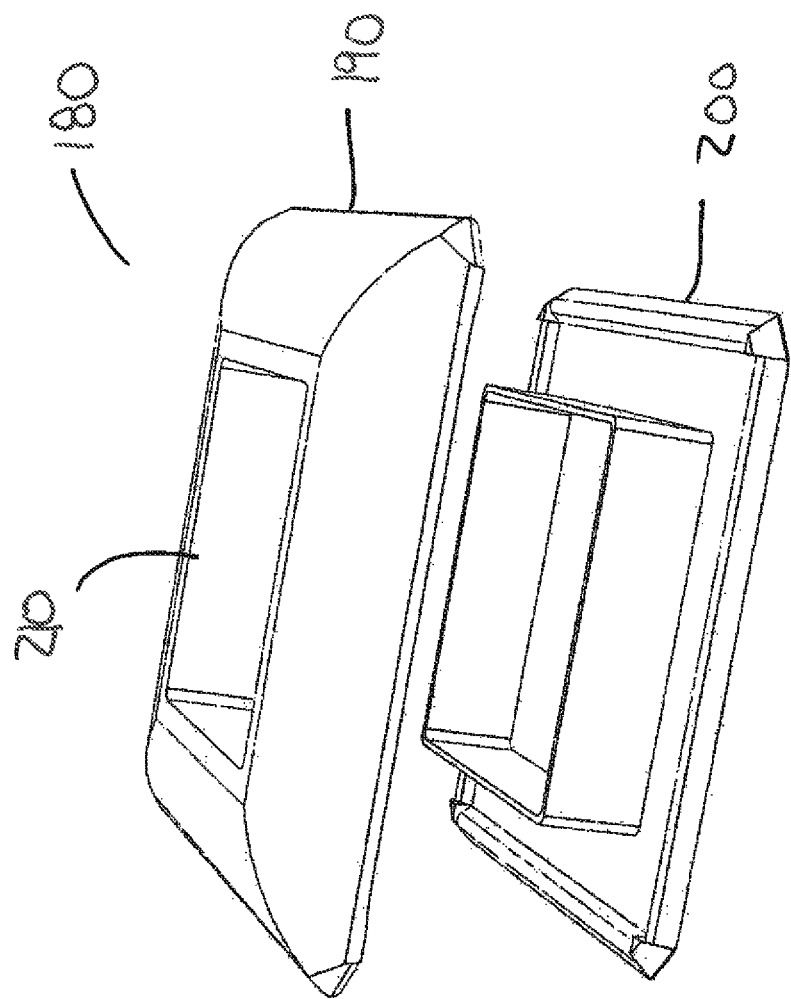

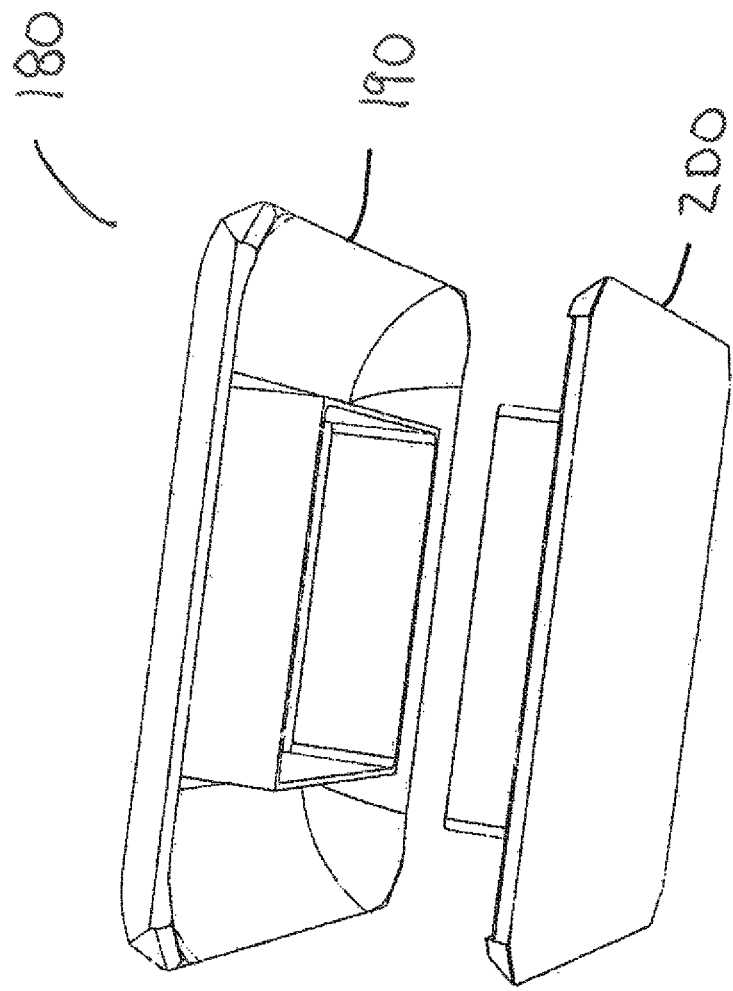

INSECT TRAP

This application claims the benefit of U.S. Provisional Patent Application Ser. No. 61/769,419, filed on Feb. 26, 2013, and U.S. Provisional Patent Application Ser. No. 61/858,908, filed on Jul. 26, 2013, the disclosure of each is incorporated herein by reference.

TECHNICAL FIELD

This disclosure relates generally to devices for monitoring and controlling insect and pest populations and, more particularly, to an easy-to-use insect trapping apparatus having a multi-piece arrangement configured for positioning under the supporting posts of beds or other types of furniture to intercept and capture insects and other pests, such as bed bugs.

BACKGROUND

An increasing problem throughout the world is the growing infestation of insects, such as bed bugs and other pests in homes and other dwelling structures. Although the term "pest" generally refers to any unwanted creature, one particular type of problematic insect is bed bugs. Bed bugs occupy and share the sleeping places of humans and feast upon them while they sleep. These pests can inhabit the spaces within the mattresses, deep within the coil springs during the daytime while waiting to attack human occupants in the middle of the night. Furthermore, they burrow deeply into the mattresses and springs and, therefore, they can be extremely difficult to exterminate.

One of the most common methods of treating bed bugs and other insects located within dwellings is to place confinement structures, such as relatively flat cardboard trays on the ground surrounding the bed or other furniture. The purpose behind this method of treatment is to lure the pest into the confinement structure. The cardboard trays are typically filled with a sticky surface such as an adhesive, which the bugs are attracted to and become stuck. Alternatively, the interior of the confinement structure may include a slick surface that prevents the insects from escaping or the interior is filled with a toxic chemical which kills the insect.

While these types of insect traps may be an effective extermination or treatment method, they also suffer from certain disadvantages. For example, these types of confinement trays are not aesthetically pleasing as they are simply placed directly on the floor in full view. Not only are these insect traps not aesthetically pleasing, but they are also inconvenient as they must be avoided by the persons and household pets occupying the dwelling. Furthermore, these insect traps usually consist of a single open housing to allow the insects to enter the trap. As a result of their open nature, children and household pets can easily get into the traps, which is disadvantageous for obvious reasons.

Another method of treating bed bugs and other vermin is spraying pesticides on the exterior of mattresses. However, this treatment method does not always reach or affect bed bugs, as they simply wait in the springs until the harmful effects have dissipated. Furthermore, spraying a mattress may be more harmful to the human sleeping on it than it is to the bed bug hidden inside of it. Another problem associated with this extermination technique is it is not safe for humans to occupy the space during fumigation or to enter or inhabit soon after the completion of the process.

Other methods for exterminating pests have been employed, many of which utilize the introduction of toxic chemicals or lethal gases, including permethrin, d-trans allethrin, methyl bromide, tetramethrin, phosphine, or the like into the extermination environment. However, this method of employing toxic chemicals poses numerous risks. Specifically, these toxic chemicals pose risks to the health of humans and damage to the ecosystem and environment as well.

Accordingly, a need is identified for an insect trap that is efficient at eliminating insects while overcoming the problems with the insect traps known in the art. Specifically, the insect trap should not affect or decrease the aesthetics of the dwelling, i.e., it should be easily hidden from view. Furthermore, the insect trap should be able to be easily monitored. Finally, the insect trap should prevent children and household pets from easily accessing the materials, i.e., adhesive located and protected within the interior of the insect trap.

SUMMARY

In accordance with one aspect of the disclosure, an insect trap for positioning directly under a furniture leg or post is provided. The insect trap includes a bottom portion having a groove positioned between an outer edge and an inner element of the bottom portion. The insect trap further includes a top portion having an opening extending through the entirety of the top portion. The top and bottom portion are removably attached to one another. The top portion may substantially cover the bottom portion. Furthermore, the bottom portion has a base having a trapezoidal cross-section.

In one embodiment, the inner element of the bottom portion has at least one recess and the top portion has an interior section extending downward from the opening. The interior section has at least one connecting device. In use, the at least one connecting device is configured to mate with the at least one recess in the inner element to removably connect the top portion to the bottom portion.

In another embodiment, an insect trap is disclosed. The insect trap has a bottom portion having a base wherein an outer edge of said base is raised, a cylindrical section extending vertically creating an opening, and a groove positioned between the outer edge of the base and the cylindrical section. The insect trap further has a top portion having a body with a corresponding opening and a corresponding cylindrical section extending vertically from the corresponding opening. The top portion and the bottom portion are configured to removably attach to one another such that the opening and the corresponding opening are aligned to receive a furniture leg.

The body of the top portion may slope from the opening to an outer edge creating an interior face. The interior face of the top portion and the outer edge of the base of the bottom portion are spaced apart when the top and bottom potions are attached. The interior face is perpendicular to the floor when the top and bottom portion are attached.

The cylindrical section and corresponding cylindrical section are configured such that they may be removably screwed together.

In yet another embodiment, a multi-piece insect trap is provided, which includes a base having a bottom side wall extending along the entirety of the perimeter of the base and an inner wall positioned within the center of said base creating a groove between the side wall and the inner wall for positioning an adhesive in the groove for trapping insects. The trap further includes a lid having a body portion extending from an opening in the center of the lid to an outer edge of the lid. The lid and the base are removably attached to one another such that the lid covers the entirety of the base while maintaining a space between the bottom sidewall of the base and the outer edge of the lid.

BRIEF DESCRIPTION OF THE DRAWINGS

The accompanying drawings incorporated in and forming a part of the specification, illustrate several aspects of this disclosure, and together with the description serve to explain the principles of the disclosure. In the drawings:

FIG. 7 is a side view of the top portion of the insect trap forming one aspect of the disclosure;

FIG. 8 is a top perspective view of an insect trap forming one aspect of the disclosure; and FIG. 9 is a bottom perspective view of the insect trap forming one aspect of the disclosure.

DETAILED DESCRIPTION

In the following detailed description, reference is made to the accompanying drawings that form a part hereof, and in which is shown by way of illustration, specific embodiments in which the disclosure may be practiced. These embodiments are described in sufficient detail to enable those skilled in the art to practice the embodiments and like numerals represent like details in the various figures. Also, it is to be understood that other embodiments may be utilized and that process or other changes may be made without departing from the scope of the disclosure. The following detailed description is not to be taken in a limiting sense, and the scope of the disclosure is defined only by the appended claims and their equivalents. In accordance with the disclosure, an insect trap is hereinafter described.

Figure 1:
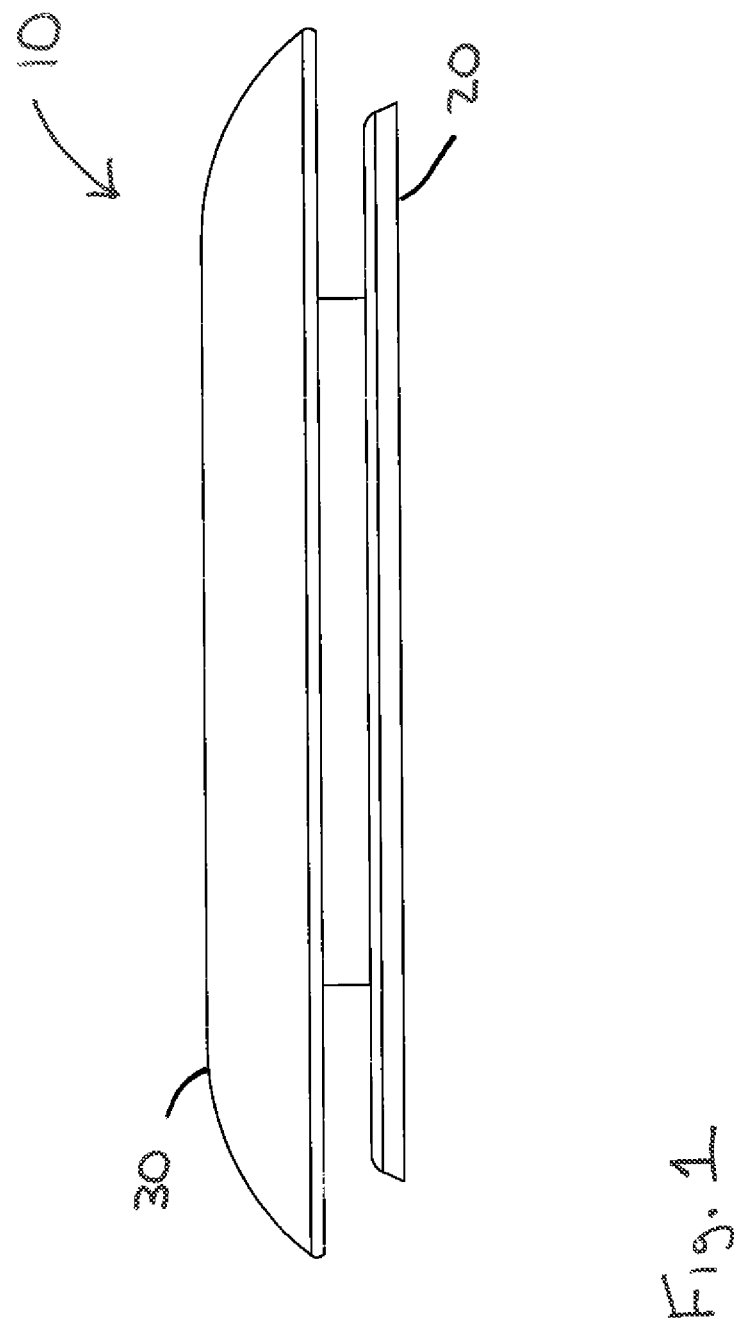
FIG. 1 is a front view of an insect trap with a top and bottom portion connected together forming one aspect of the disclosure.
Figure 2:
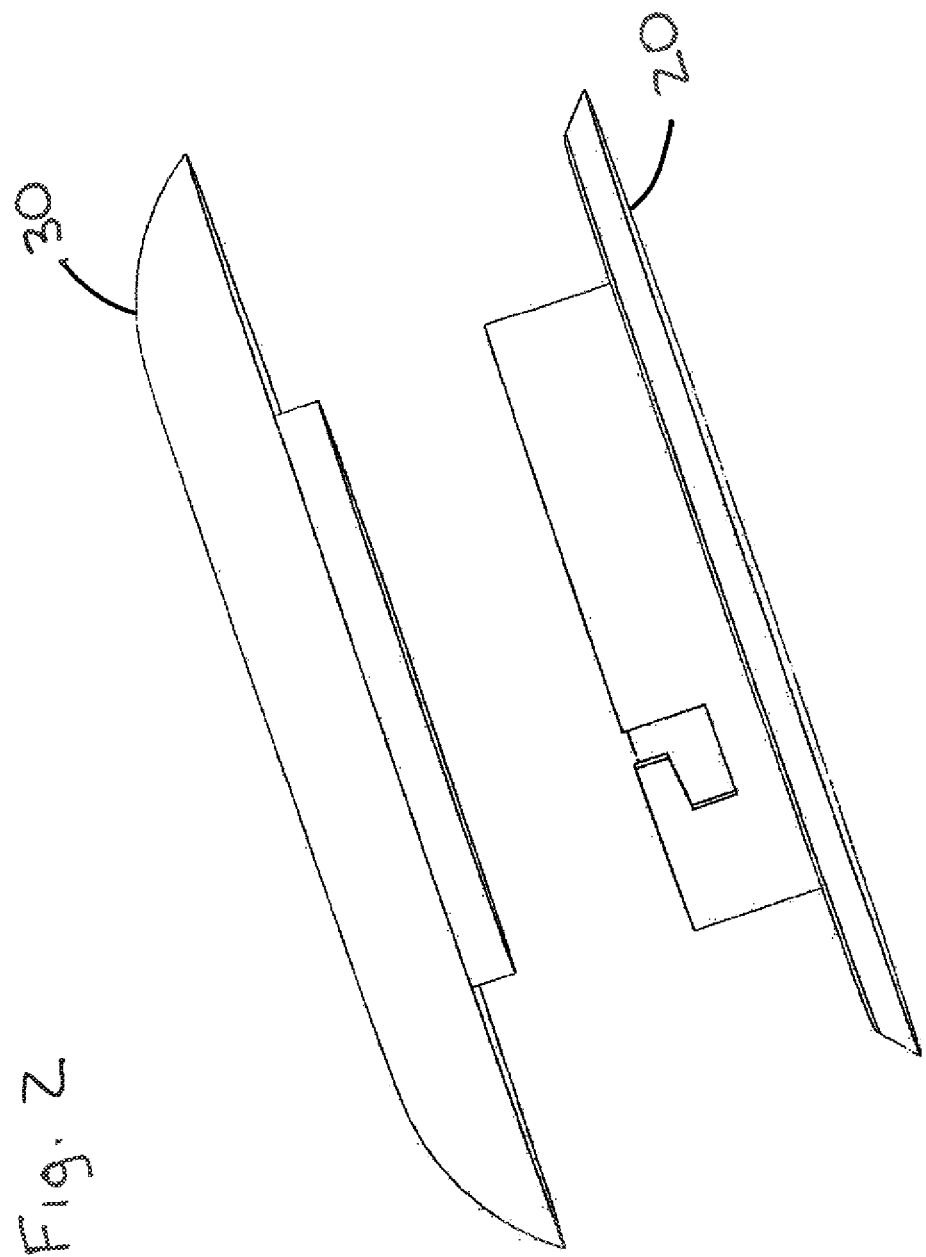
FIG. 2 is a front view of the insect trap with the top and bottom portion not connected together forming one aspect of the disclosure.

As shown in FIG. 1, a representative insect trap 10 is illustrated. The insect trap 10 has a multi-piece configuration including two distinct portions that may be removably connected to each other. Turning to FIG. 2, a first or bottom portion or base 20 is typically placed directly on the floor or carpet while a second or top portion or lid 30 removably connects to the bottom portion 20. Each of the top 30 and bottom portions 20 are made of a substantially rigid material, such as plastic to promote durability. Furthermore, the top and bottom portions are substantially the same shape. For example, as shown in FIGS. 1-7, each portion is substantially circular, while FIGS. 8 and 9 illustrate each of the portions as being substantially square. Furthermore, it should be appreciated that other shapes for the top and bottom portions may be used, such as substantially rectangular or octagonal shape.

Although the portions are substantially the same shape, the diameter of the top portion 30 is typically larger than the diameter of the bottom portion 20 for protecting the interior of the bottom portion where the adhesive and trapped insects are positioned. Advantageously, due to this arrangement, occupants of the house are prevented from unintentionally accessing the adhesive and infants and household pets cannot easily obtain access to the adhesive.

Figure 3:
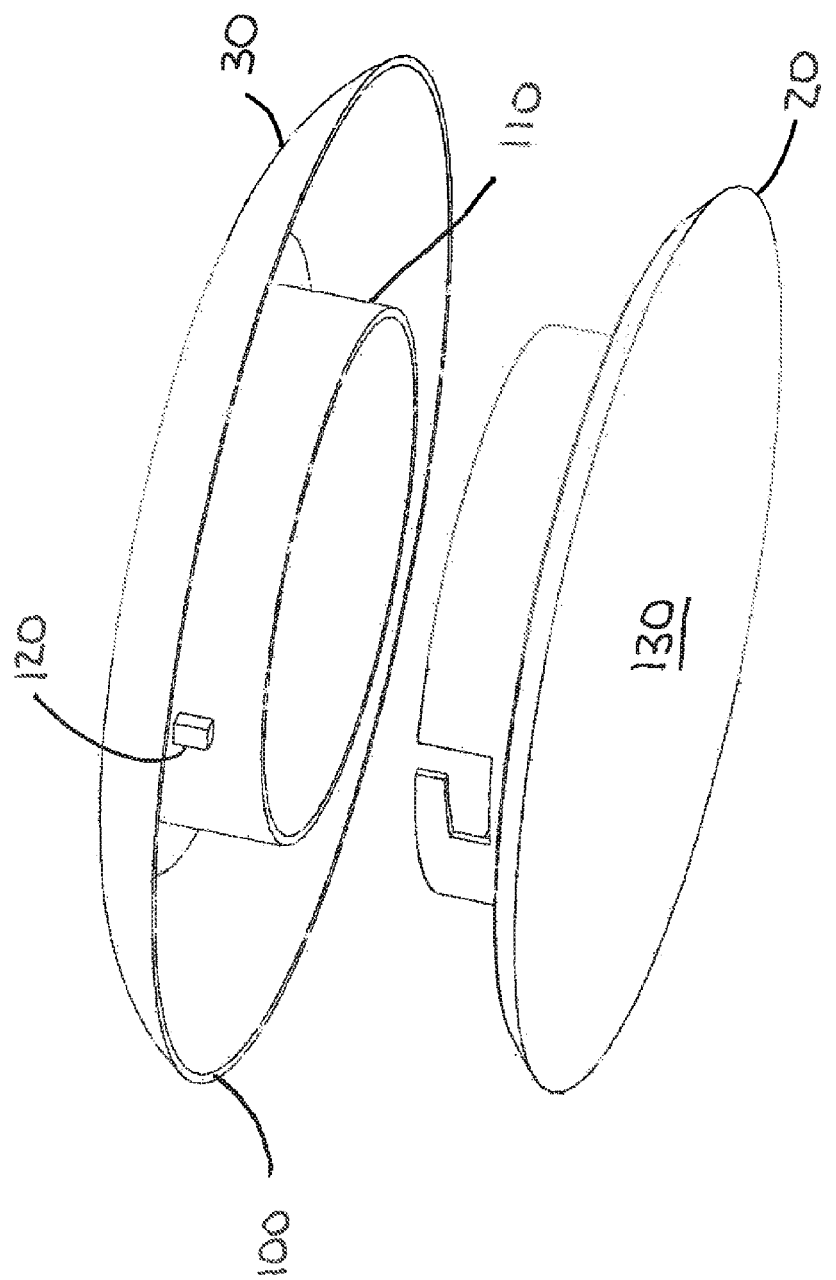
FIG. 3 is a bottom perspective view of the top and bottom portion of the insect trap forming one aspect of the disclosure.
Figure 4:
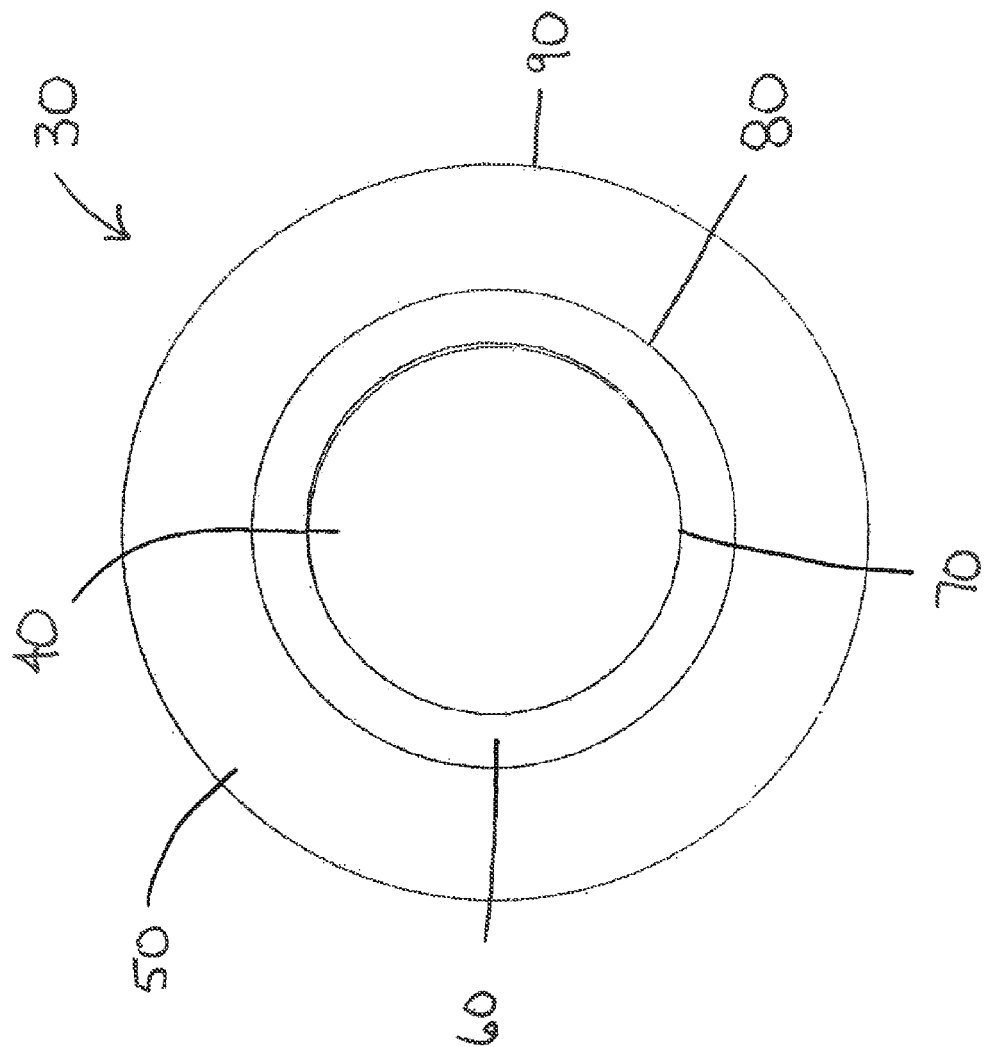
FIG. 4 is a top view of the top portion of the insect trap forming one aspect of the disclosure.

With reference to FIGS. 3 and 4, the top portion 30 has an opening 40 in its center. The opening 40 is completely encompassed by the body 50 of the top portion. The body 50 of the top portion has a flat circular section 60 beginning at an inner edge 70 of the opening 40 and extending around the entire opening 40. The body 50 slopes downward from an outer edge 80 of the flat section 60 to an end 90 of the top portion 30 wherein an interior face 100 is formed. The slope is relatively gradual and may be at a constant downward angle to the end 90. The interior face 100 is substantially perpendicular to the floor when the trap is in use. The downward slope of the body 50 creates a dome-like shape for completely covering the bottom portion 20.

The top portion 20 has an interior section 110 that extends downward from the opening 40 beginning below the inner edge 70 and extending below the outer edge 80. Accordingly, the opening 40 is continuous through the entirety of the top portion 30. Furthermore, the opening 40 is substantially the same size at the top and bottom of the top portion for receiving a leg or post from a piece of furniture. At least one connecting device 120 extends from underneath the top portion 30 adjacent to the opening 40. When two connecting devices 120 are used, they may be positioned approximately equidistant from each other on opposite sides of the opening 40. As shown in FIG. 2, the connecting device 120 may be substantially rectangular and extend downward for removably connecting with a recess in the bottom portion 20 to lock the portions together as discussed in more detail below.

Figure 5:
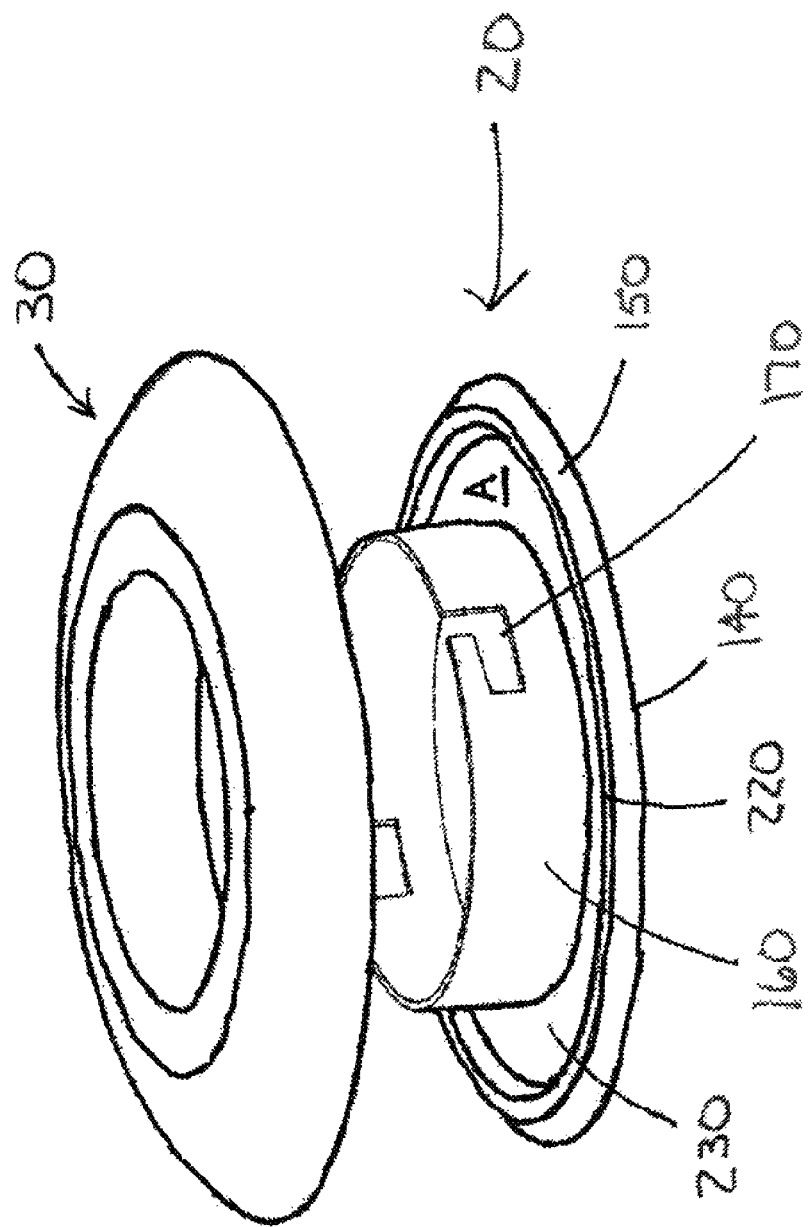
FIG. 5 is a top perspective view of the top and bottom portion of the insect trap forming one aspect of the disclosure.

Turning to FIG. 5, the bottom portion 20 has a substantially circular base section 130. An outer edge 140 of the base section is tapered inward creating an outer wall 150 such that the base 130 has a trapezoidal cross-section. In the center of the base section 130, a substantially circular raised section 160 extends upwards. The raised section 160 has at least one recess 170 for receiving the connecting device 120 from the top portion 30 to removably connect the two portions together. When two recesses 170 are used, they may be positioned approximately equidistant from each other on opposite sides of the raised section 160 to correspond to the connecting devices 120 on the top portion 30. In one embodiment illustrated in FIGS. 2, 3 and 5, the recesses 170 may be in the form of an L-shaped notch that allows the corresponding connecting devices 120 to slide within the notch and lock the portions together.

The top and bottom portions may be locked together by simply turning or sliding one of the top or bottom portions until the connecting device(s) 120 mate and lock with the corresponding recess(es) 170. In order for the top and bottom portions to mate together, one of the raised section 160 and the interior section 110 are smaller than the other such that one fits within the other to properly mate and lock together. The top portion may have a fastener such as a screw that allows the trap to be adjustable to different floor coverings, such as different types of carpet or hardwood floorings.

Once connected together, the raised section 160 and the downward extending interior section 110 from the top portion 30 form an opening for receiving a leg or post from a piece of furniture. When connected together, the raised section 160 and the downward extending exterior section 110 are substantially vertical such that insects that are trapped within these sections cannot easily escape. These sections may be treated with a powder, such as talc to increase the slickness to further prevent insects from escaping. Similarly, the top and bottom portions may be unlocked by simply turning or sliding one of the top or bottom portions so that the trap may be easily monitored. It should be appreciated that the raised section of the bottom portion and the downward extending interior section of the top portion may come in different shapes corresponding to the overall shape of the top and bottom portions. For example, as shown in FIGS. 8 and 9, a trap 180 includes top portion 190 and bottom portion 200, which are substantially square-shape and these portions form an opening 210 when connected together that is also a square shape.

The outer wall 150 of the bottom portion 30 is raised to create a lip 220 which protects an inner groove 230 located between the interior of the outer wall 150 and the raised center section 160. The inner groove 230 is typically filled with an adhesive (A) to trap the insects within the adhesive. The adhesive may be any standard adhesive known to be used in pest control. The lip 220 serves to hold the adhesive or glue and prevents hands from persons from getting into the glue as when the top and bottom portions are connected, it pushes a hand reaching into the device upward away from the glue. Again, the top portion 30 is positioned over the bottom portion 20 and covers the entirety of the bottom portion such that the inner groove 230 and the adhesive located therein are protected from the top portion. In other words, the inner groove 230 has a roof over it, which is created by the top portion 30. As a result, insects and other pests typically are only able to enter the trap 10 over the lip 220 whereby they immediately become stuck and trapped by the adhesive in the inner groove 230. It should be appreciated the edge of the lip 220 as well as other portions of the exterior surface of the trap may have a relatively rough surface to aid the insects in climbing into the trap. However, the interior surfaces of the trap should be substantially smooth (and may be further treated with a powder, such as talc) to prevent the insects from getting out of the trap even if the insects are not stuck in the adhesive.

The body 50 including the interior face 100 of the top portion 30 is spaced apart from the base section 110 of the bottom portion 20 are spaced apart when in use, i.e., when the top and bottom portions are connected. Indeed, the only aspect of the top portion 30 that connects with any part of the bottom portion 20 is the interior section 110. Importantly, the interior face 100 of the top portion 30 does not contact the base section 110 of the bottom portion 20 so as to allow bed bugs and other insects to easily enter into the trap 10 over the lip 220. However, this arrangement prevents children and household pets from easily accessing the inner groove housing the adhesive.

The insect trap 10 is primarily designed to be used with many types of furniture, such as sofas, dressers and beds. Typically, the insect trap 10 is placed underneath the furniture and configured to allow a leg of the furniture to be inserted through the opening 40 in the top and bottom portions 20, 30. As a result, it should be appreciated that the insect trap 10 may be formed in many different sizes and shapes configured to receive a leg of the furniture. Advantageously, since the leg of the furniture is placed through the center of the insect trap 10, the trap is mostly hidden from view by the piece of furniture, so it does not detract from the appearance of the dwelling or house.

Figure 6:
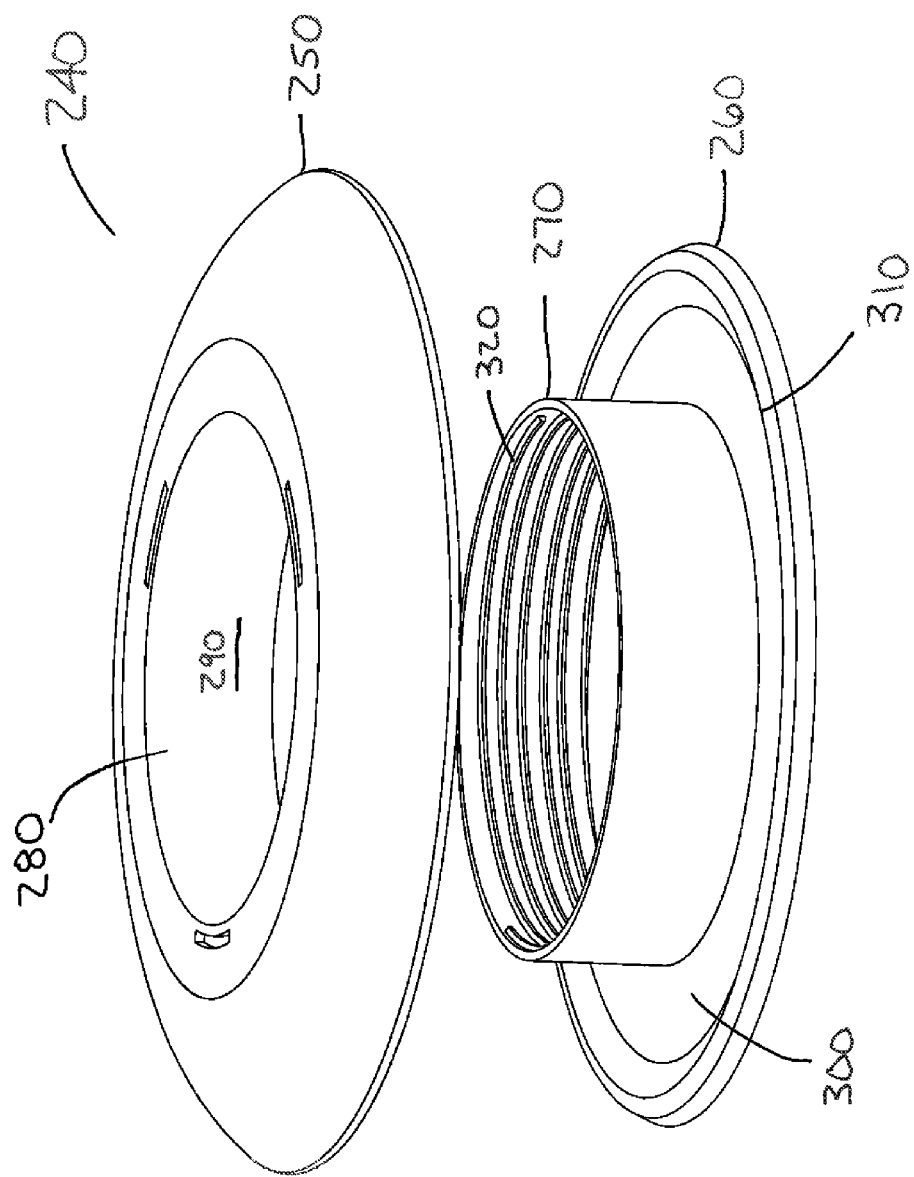
FIG. 6 is a perspective view of an insect trap forming one aspect of the disclosure.

Turning to FIGS. 6 and 7, another embodiment of an insect trap 240 is disclosed. In this embodiment, the top portion 250 and bottom portion 260 are substantially the same as the previous embodiment with the primary difference being the manner of the connection between the two portions. In particular, the circular bottom portion 260 has a raised section 270, which is at least partially threaded internally with threads 320, such as a triple helix thread. Similarly, the top portion 250 has an opening 280 with a downwardly extending section 290 corresponding to the raised section 270 of the bottom portion 260. The exterior surface of the downwardly extending section 290 has at least one notch 330 such that the top portion may screw into the bottom portion such that they are removably connected. Alternatively, the exterior surface of the downwardly extending section 290 may be partially or completely threaded to match the threads on the raised section 270.

In an additional embodiment, the raised section 270 of the bottom portion may be at least partially externally threaded, while the downwardly extending section 290 of the top portion may be at least partially internally threaded or have at least one notch on its internal surface. Depending on the particular threaded arrangement, one of the two sections is smaller than the other such that one fits within the other to properly mate and lock together. For example, if the raised section 270 of the bottom portion 260 is internally threaded as shown in FIG. 6, it is larger in diameter than the downwardly extending section 290 of the top portion 250, which has external notches 330 (as shown in FIG. 7) such that the downwardly extending section fits around and screws onto the raised section.

Advantageously, this allows the insect trap to be adjustable for different types of floor coverings, such as differing carpet types having various heights. Moreover, the top and bottom portions may be easily unscrewed from one another such that a person may monitor the trap, i.e., view the number and types of insects being caught inside the trap and view the amount of adhesive within the trap to determine whether the existing adhesive should be replaced or refilled. With the exception of the threads replacing the connecting devices and recesses, this trap 240 has the same appearance and features and functions substantially the same as the trap 10. As a result, the top portion 250 of the trap 240 protects the adhesive located within the inner groove 300 of the bottom portion 260 and the lip 310 of the bottom portion 260 prevents also protects the adhesive.

It is well known that it is difficult to monitor bed bugs and determine whether all of the beg bugs have been exterminated or captured. However, the insect trap disclosed herein allows for more efficient monitoring of bed bug activity. Namely, the insect trap is placed in a desired area and may be regularly checked by simply disconnecting or unscrewing the top portion from the bottom portion and viewing the adhesive. If after a certain period of time, no bed bugs are observed in the adhesive, it should be recognized that all the bed bugs have been eliminated from the dwelling and the insect trap may be removed.

The foregoing descriptions of various embodiments are provided for purposes of illustration, and are not intended to be exhaustive or limiting. Modifications or variations are also possible in light of the above teachings. The embodiments described above were chosen to provide the best application to thereby enable one of ordinary skill in the art to utilize the disclosed inventions in various embodiments and with various modifications as are suited to the particular use contemplated. All such modifications and variations are within the scope of the disclosure.

The invention claimed is:

1. An insect trap for positioning directly under a furniture leg or post, comprising:

a bottom portion having a groove positioned between an outer edge of said bottom portion and an inner element, wherein said outer edge of said bottom portion is tapered inward toward the groove creating a raised side wall having a rough surface to aid insects in climbing into the trap, said bottom portion further having a lip formed from the raised side wall for protecting the groove;

an adhesive positioned within the groove; and a top portion having an opening extending through the entirety of said top portion and a body having a flat circular section beginning at an inner edge of the opening and extending around an entirety of the opening, said body sloping downwardly from an outer edge of the flat circular section to an end of the top portion forming an interior face, whereby the top and bottom portion are removably attached to one another such that the top portion substantially covers the bottom portion while maintaining a non-overlapping vertical space between the interior face of the top portion and the lip of the bottom portion such that the adhesive may be monitored for insects.

2. The insect trap according to claim 1, wherein the bottom portion has a base having a trapezoidal cross-section.

3. The insect trap according to claim 1, wherein the inner element of the bottom portion has at least one recess.

4. The insect trap according to claim 3, wherein the top portion has an interior section extending downward from the opening.

5. The insect trap according to claim 4, wherein the interior section has at least one connecting device.

6. The insect trap according to claim 5, wherein the at least one connecting device is configured to mate with the at least one recess in the inner element to removably connect the top portion to the bottom portion.

7. The insect trap according to claim 1, wherein the top and bottom portions are substantially circular-shaped.

8. The insect trap according to claim 1, wherein the top and bottom portions are substantially square-shaped.

* * * * *